Dec. 1, 1953 C. W. WALZ ET AL 2,660,967
FRAME CONSTRUCTION FOR PLANTERS
Original Filed Jan. 24, 1946 2 Sheets-Sheet 2

INVENTORS
CLAUDE W. WALZ
HOWARD F. CLAUSEN
BY
ATTORNEYS

Patented Dec. 1, 1953

2,660,967

UNITED STATES PATENT OFFICE 2,660,967

FRAME CONSTRUCTION FOR PLANTERS

Claude W. Walz, Rock Island, and Howard F. Clausen, Moline, Ill., assignors to Deere & Company, Moline, Ill., a corporation of Illinois Original application January 24, 1946, Serial No. 643,016. Divided and this application March 25, 1950, Serial No. 151,842

3 Claims. (Cl. 111—52)

This application is a division of our co-pending application, Serial No. 643,016, filed January 24, 1946, now U. S. Patent 2,596,060, issued May 6, 1952.

The present invention relates generally to agricultural implements and more particularly to planters and the like.

The object and general nature of the present invention is the provision of a towed planter or similar implement especially constructed and arranged for planting in a plurality of relatively closely spaced rows, as is desirable when planting beets, beans, and other crops. A further feature of this invention is the provision of a planter in which there are a plurality of independently shiftable planting units connected with the main frame of the planter along its forward part, with ground wheels supporting the main frame, and with the planting units, ground wheels, and other parts arranged for transverse adjustment along the frame so as to provide for varying the row spacing. More particularly, it is a feature of this invention to provide an implement of this kind in which the seed cans can be carried in a low position, one on each of the planting units, with the result that the seed passages from the seed dispensing mechanisms into the furrows may be made quite short. This materially improves the accuracy of planting, especially in the case of seeds that are very light, such as sugar beet seed.

Additionally, it is another feature of this invention to provide improved wheel frames for the ground wheels of the implement, so constructed and arranged as to provide for adequate support of the frame on the wheels but without interfering with any of the parts of the planting units, even in their most narrow setting.

These and other objects and advantages of the present invention will be apparent to those skilled in the art after a consideration of the following detailed description, taken in conjunction with the accompanying drawings in which the preferred form of the present invention has been illustrated.

Figure 1:
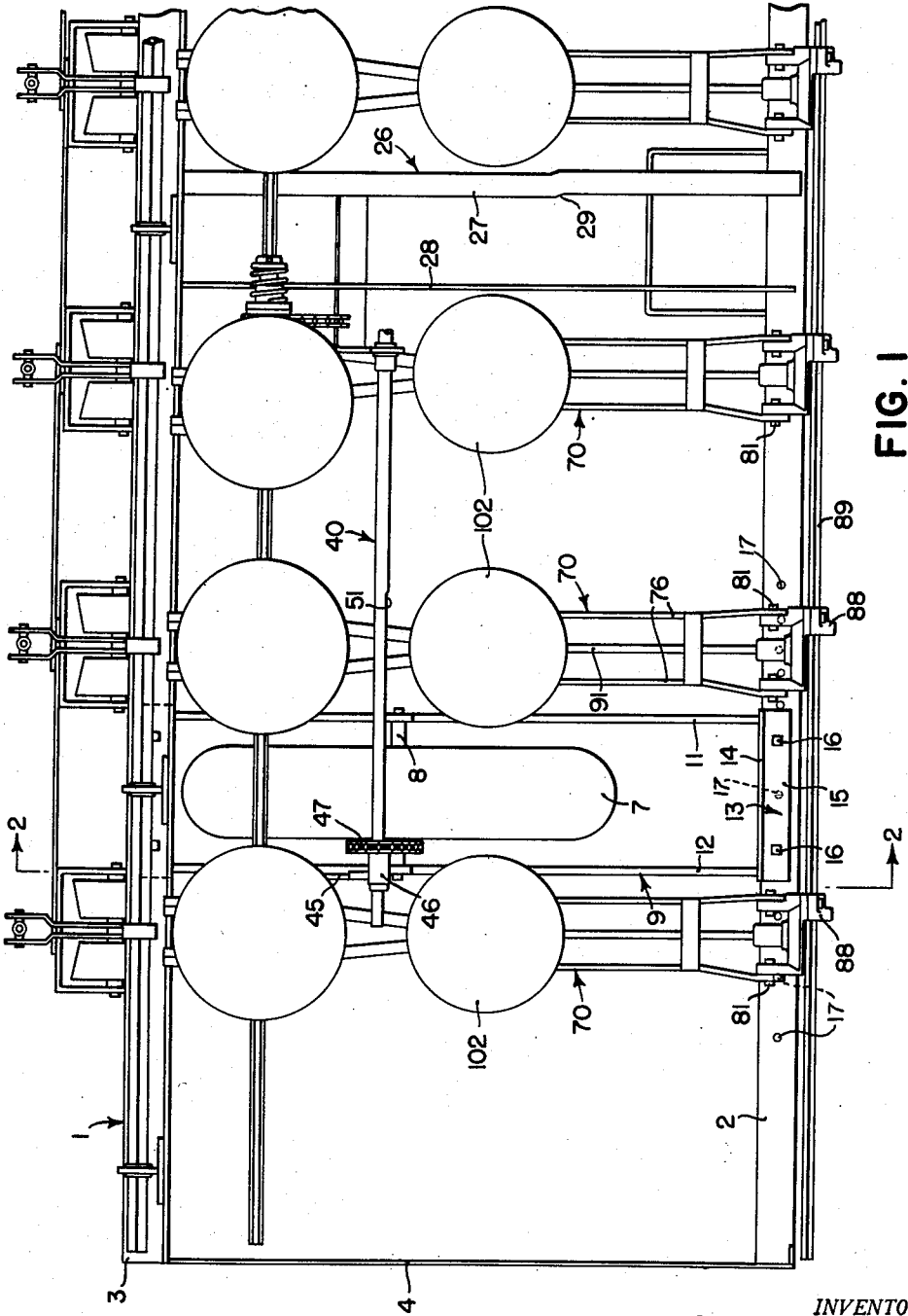
Figure 1 is a top or plan view of a major portion of a planter in which the principles of the present invention have been incorporated.
Figure 2:
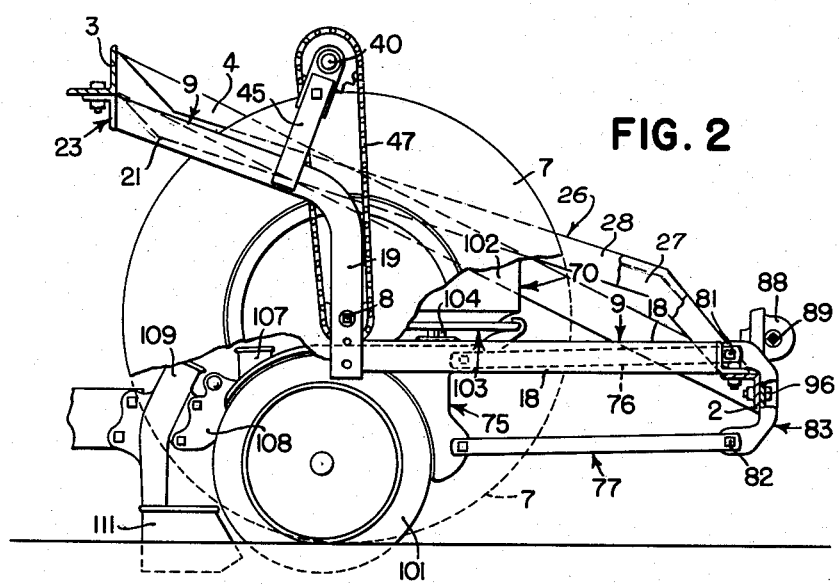
Figure 2 is a view taken generally along the line 2—2 of Figure 1.
Figure 3:
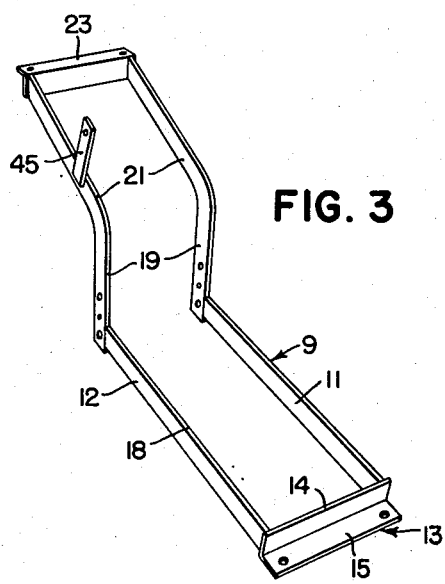
Figure 3 is a fragmentary perspective view showing one of the wheel frames by virtue of which a low down mounting of the seed cans is achieved but without sacrificing adjustments for narrow row spacing.

Referring now to the drawings, more particularly to Figure 1, the main frame of the planter is indicated by the reference numeral 1 and comprises a front transverse frame bar 2, preferably in the form of an angle, and a rear transverse frame bar 3, also preferably in the form of an angle, connected together by longitudinally extending crossbars 4 at the ends of the frame 1 and by wheel frames and a power lift unit frame, referred to below in detail. As best shown in Figure 2, the front transverse frame bar 2 is materially lower than the rear transverse frame bar 3 so that, considering the frame 1 as a whole, it is disposed in a generally downwardly and forwardly extending plane. The frame 1 is supported on a pair of ground wheels 7, disposed between the ends of the frame 1. Each ground wheel 7 is mounted on an axle 8 (Figure 1) secured to a wheel frame 9, one of which is shown in perspective in Figure 3. Each wheel frame 9 comprises a pair of laterally spaced bars 11 and 12 connected together at their forward ends by an angle 13 to the vertically upwardly extending flange 14 of which the forward ends of the bars 11 and 12 are welded. The horizontal flange 15 of the angle 13 is secured, as by bolts 16, to the front frame angle 2, the latter having a plurality of openings 17 to receive the bolts 16 at different positions of lateral adjustment. Each of the bars 11 and 12 making up each wheel frame 9 includes a horizontal section 18 (Figure 2), a vertical section 19 and an upwardly and rearwardly extending section 21, each of the sections 21 of the two frame bars 11 and 12 being secured, as by welding or the like, to the downwardly extending flange of an attachment angle 23 that is bolted to the rearwardly extending horizontal flange of the rear frame angle 3. In general, each of the wheel frame bars 11 and 12 constitutes an L-shaped member having a horizontal forward section which is disposed generally in the plane of the lower front frame angle 2, these forward portions being disposed so as to clear the adjacent seed cans of the planting units, as will be explained in detail below.

The frame 1 also includes centrally thereof a power lift frame unit indicated in its entirety by the reference numeral 26 and comprising an angle 27 secured, as by welding, to the front frame angle 2 and bolted or otherwise fastened to the rear frame angle 3. The unit 26 includes a right-hand frame member 28, preferably in the form of a strap member also welded at its front end to the frame angle 2 and bolted or otherwise fastened to the rear frame angle 3. The angle 27 includes a section 29 offset laterally inwardly so as to make the unit 26 as narrow as possible at the rear portion in order to clear the adjacent seed can, especially in the narrow setting of the planting units, as will be referred to below in detail.

As best shown in Figure 2, the axles 8 are connected with the wheel frame bars 11 and 12 just above the junction of the horizontal front section 18 with the vertically extending section 19. This disposes the major portions of the wheels below the general plane of the frame bars 2 and 3, as best shown in Figure 2. Through bracket means with which the present invention is not particularly concerned, the rear portion of the frame unit 26 supports the central parts of a drive shaft or jackshaft unit 40, the outer end of the unit 40 being carried on the rear portion of the associated wheel frames 9. To this end, the laterally outer bar of each of the wheel frame units 9 carries an upwardly extending bracket 45 to the upper end of which a bearing unit 46 is connected. Through sprocket and chain means 47 each ground wheel 7 drives the associated end of the jackshaft or drive shaft unit 40. Each sprocket and chain means 47 is slidably associated with the jackshaft unit 40, each jackshaft section being flattened, as at 51, whereby to establish the desired driving relation in different positions of lateral adjustment of the wheel and wheel frame along the main frame 1 of the planter.

The main frame 1 carries a plurality of laterally adjustable right- and left-hand planting units, each of which is indicated in its entirety by the reference numeral 70. These planting units are of conventional construction, so far as the present invention is concerned, and therefore it will suffice for purposes of the present description to note that each planting unit includes a seed-fertilizer boot casting 75 to vertical spaced points on which upper and lower link members 76 and 77 are pivotally connected. At their forward ends the link members 76 and 77 are pivoted, as at 81 and 82, to the upper and lower portions, respectively of a drawbar bracket 83. The latter also supports, as by bearing sections 88, a transverse seeding shaft 89 which extends the length of the main frame. By means of pairs of bevel gears, the seed dispensing drive shaft sections 91 of the several planting units are driven from the seeding shaft 89. The brackets 83 may be shifted to different lateral positions along the frame bars 2 and to this end the vertical flange of the latter is provided with the plurality of openings (not shown) to receive bolts 96 or the like (Figure 2) by which the brackets 83 may be fixed to the frame bar 2 in any selected position.

Each seed-fertilizer boot 75 is provided with a pair of disk furrow openers 101 journaled thereon in any suitable manner, and each boot 75 also carries a seed can 102 in the lower portion of which a seed dispensing means 103 is disposed and is driven by means including gearing 104 (Figure 2) establishing a connection between the seed dispensing mechanism and the drive shaft 91. Each of the seed-fertilizer boots 75 is provided with a fertilizer passageway 107 and, rearwardly thereof, a bracket 108 which may, where desirable or necessary, receive an auxiliary fertilizer conduit 109 to which a separate fertilizer furrow opener 111 may be secured. Either of the fertilizer conduits 107 and 109 may receive a fertilizer tube, depending on whether it is desired to deposit the fertilizer in the furrow opened by the seed furrow openers 101 or in a separate furrow opened by the tool 111. Seed from the seed can 102 is delivered into the furrow opened by the disks 101 by any suitable means, so far as the present invention is concerned.

It will be noted, particularly from Figure 1, that where the planting units 70 are spaced fairly close together, the disposition of the jackshaft or drive shaft unit 40 and the vertical sprocket and chain means 47 in positions rearwardly of the seed cans 102 accommodates a close spacing of the latter. Looking at Figure 2, it will be seen that the wheel frame bars 11 and 12 are placed in a low down position so that the horizontal portions 18 thereof actually pass under the adjacent parts of the seed cans 102 when the seeding units are arranged for relatively narrow row spacing, a particular advantage of the present invention.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. A planter comprising a frame including a transverse rear frame bar, a forward transverse frame bar, a plurality of generally downwardly and forwardly extending crossbars connected at their rear ends to the rear frame bar and at their forward ends to the forward transverse bar, a plurality of planting units connected with the forward transverse frame bar and extending generally rearwardly therefrom, each of said units including a seed can, a wheel frame connected between said transverse frame bars, said wheel frame including members having a forward generally horizontal section disposed generally in the horizontal plane of said forward transverse frame bar and an upwardly extending section, means connecting the latter section with the rear transverse bar, each of said forward wheel frame sections including laterally spaced portions, the lateral spacing of which is greater than the lateral distance between adjacent seed cans, said portions being disposed below the level of and at least partially underneath the adjacent seed can, a ground wheel disposed in the space between adjacent seed cans, and means supportingly connecting said ground wheel with the associated wheel frame.

2. The invention set forth in claim 1, further characterized by each of said wheel frame members being connected with the planter frame so that the transverse vertical plane including the center portions of the upwardly extending wheel frame sections is disposed rearwardly of the seed cans of said planting units.

3. The invention set forth in claim 1, further characterized by means for mounting said ground wheel on the upwardly extending sections of the associated wheel frame.

CLAUDE W. WALZ.
HOWARD F. CLAUSEN.

References Cited in the file of this patent

UNITED STATES PATENTS

| Number | Name | Date |
|---|---|---|
| 2,033,366 | White | Mar. 10, 1936 |
| 2,368,134 | Haas | Jan. 30, 1945 |
| 2,376,464 | White | May 22, 1945 |